United States Patent [19]
Fishler

[11] Patent Number: 5,930,109
[45] Date of Patent: Jul. 27, 1999

[54] ELECTROLYTIC CAPACITOR WITH MULTIPLE INDEPENDENT ANODES

[75] Inventor: Matthew G. Fishler, Sunnyvale, Calif.

[73] Assignee: Pacesetter, Inc., Sunnyvale, Calif.

[21] Appl. No.: 08/965,915

[22] Filed: Nov. 7, 1997

[51] Int. Cl.⁶ ..................................................... H01G 9/04
[52] U.S. Cl. ........................... 361/508; 361/512; 361/516; 361/528; 361/532
[58] Field of Search ..................................... 361/302, 303, 361/301.3, 301.4, 508, 504, 511, 512, 516, 517, 520, 523, 522, 524, 528, 530, 531, 532, 535, 537, 538, 541; 29/25.03; 602/5, 4, 16, 36; 216/6

[56] References Cited

U.S. PATENT DOCUMENTS

| | | | |
|---|---|---|---|
| 2,994,809 | 5/1961 | Jenny et al. .............................. | 361/504 |
| 3,010,056 | 11/1961 | Kurland et al. ........................... | 361/522 |
| 3,398,332 | 8/1968 | Logan ....................................... | 361/520 |
| 3,611,051 | 10/1971 | Puppolo ................................... | 361/531 |
| 4,298,906 | 11/1981 | Elias ........................................ | 361/520 |

*Primary Examiner*—Kristine Kincaid
*Assistant Examiner*—Anthony Dinkins
*Attorney, Agent, or Firm*—Steven M. Mitchell

[57] ABSTRACT

An electrolytic capacitor having several cathode layers and several anode layers stacked in a single housing. At least some of the anode layers are electrically interconnected in a group electrically isolated from another group of electrically interconnected anodes. Separate electrical connections permit the separate groups to be independently connected to external circuitry.

16 Claims, 3 Drawing Sheets

ELECTROLYTIC CAPACITOR WITH MULTIPLE INDEPENDENT ANODES

FIELD OF THE INVENTION

The invention relates to capacitors, and more particularly to flat capacitors having multiple stacked anode and cathode sheets.

BACKGROUND AND SUMMARY OF THE INVENTION

Capacitors are used in implantable defibrillators for accumulating an electrical charge from internal batteries, so that rapid discharge of the capacitor may provide a substantial shock for cardiac therapy. A single capacitor has a basic decay pattern in which the voltage begins at a nearly instantaneous spike, and decays at a rate determined by the characteristics of the device. When different discharge characteristics are desired, such as when an extended initial period of higher voltage is needed, a second capacitor has been used. This permits simultaneous discharge to provide a maximum voltage or current, with connection in series or parallel. The time of discharge of the different capacitors may be staggered to provide a two-peak output, with the second discharge occurring before the voltage level from the first has dropped below a selected threshold.

To provide additional flexibility and controllability of the output wave form, more individual capacitors may be used. However, multiple separate capacitors are less volume efficient than a single larger capacitor, in that they have a lesser aggregate capacitance per unit volume. This is a particular concern in implantable medical devices and numerous other applications in which miniaturization is important. Thus, there is a trade off between the output control and size.

The present invention overcomes the limitations of the prior art by providing an electrolytic capacitor having several cathode layers and several anode layers stacked in a single housing. At least some of the anode layers are electrically interconnected in a group electrically isolated from another group of electrically interconnected anodes. Separate electrical connections permit the separate groups to be independently connected to external circuitry.

DETAILED DESCRIPTION OF A PREFERRED EMBODIMENT

Figure 1:
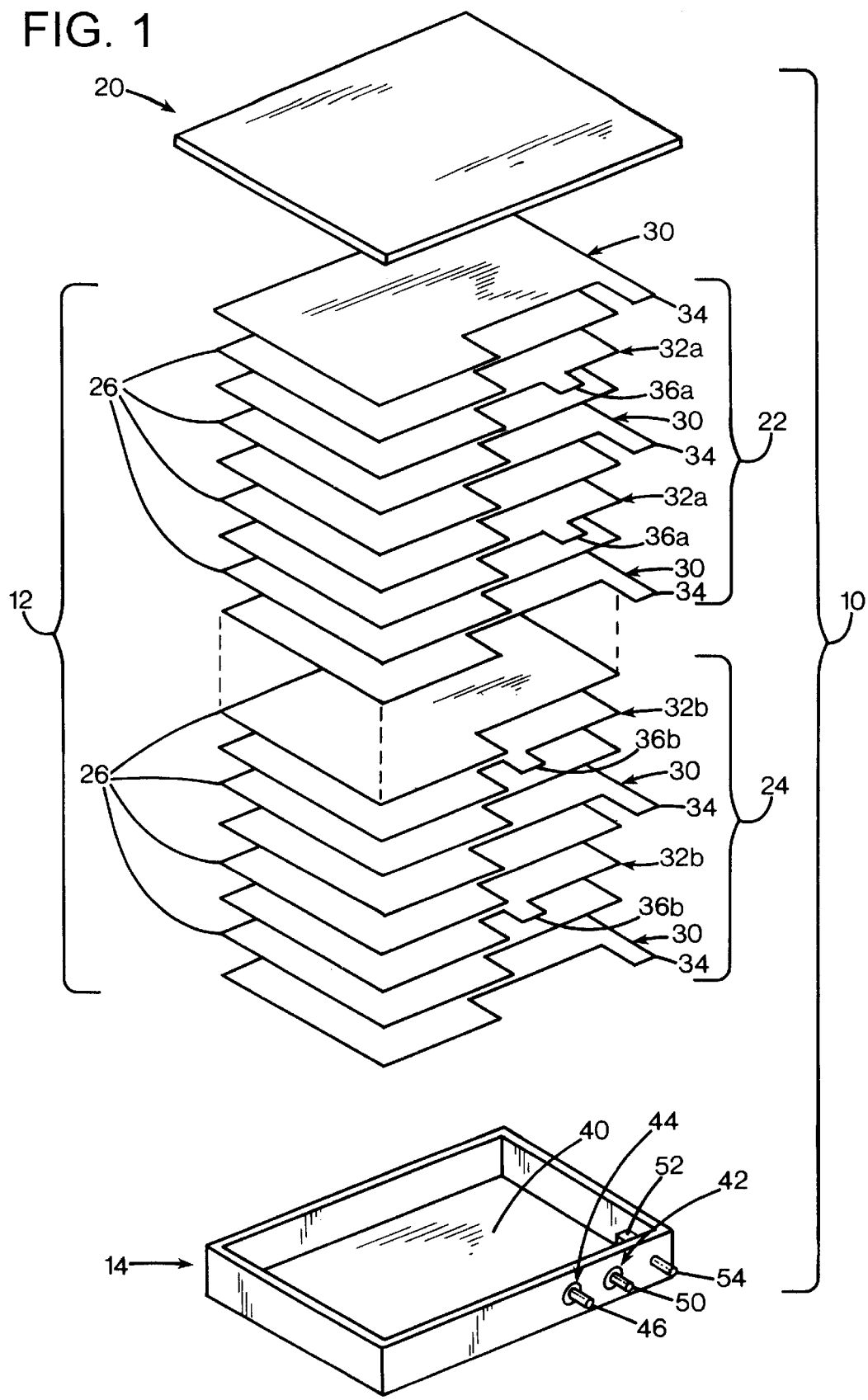
FIG. 1 is an exploded isometric view of a capacitor according to a first embodiment of the present invention.

FIG. 1 illustrates a capacitor 10 having a flat stack 12 of alternating conductive and separator sheets within a housing 14 enclosed by a lid 20. The stack is divided into two groups 22, 24 of sheets, although the number of groups may vary widely in alternative embodiments of the invention.

In each group of the stack, the sheets alternate between paper separator sheets 26, and conductive cathode sheets 30 or anode sheets 32a (in the first group 22,) 32b (in the second group 24.) In the spaces formed between adjacent separator sheets, the cathodes alternate with the anodes. In variations on the simplest versions illustrated below, cathode and separator sheets may be eliminated in places between anodes, with the electrolyte fluid between immediately adjacent anode sheets providing a conductive layer connected electrolytically to other of the cathodes, and defined herein as the equivalent of a cathode layer. In the preferred embodiment, the dielectric is provided by an oxide layer on the etched surface of the anodes, while the cathode includes the conductive sheets, the electrolyte-saturated separator layers, and the electrolyte that fills all tunnels on the surface of the anodes.

Each of the cathodes 30 has a cathode tab 34, all of which are registered with each other to be compressed together for electrical interconnection, as will be discussed below. The anodes 32a of the first group 22 have anode tabs 36a registered with each other, while the anodes 32b of the second group 24 have anode tabs 36b registered with each other but offset from the position of the first group anode tabs. Thus, the anode tabs of each group may be electrically interconnected separately, so that each group may function as a separate capacitor, but within the same housing.

The illustration shows each group having only two anodes for simplicity, although in the preferred embodiment, there are 2 or more groups of 6 or more anode layers per group. In alternative embodiments, the number of groups may range from 2 to 16, with from 1 to 40 anodes per group. Additionally, one or both of the end cathodes may be removed, with the housing itself connected to the other cathodes and functioning as a cathode.

The housing 14 is an aluminum box that defines a chamber 40 in which the stack 12 is closely received. The chamber has a depth equal to the thickness of the stack. The housing is provided with a pair of feed through connectors 42, 44, each of which has an electrically conductive lead 46, 50 that extends out of the housing for connection to other circuitry, with an insulative sleeve surrounding the lead and closely received in a bore defined in the wall of the housing to form an environmental seal.

Figure 2:
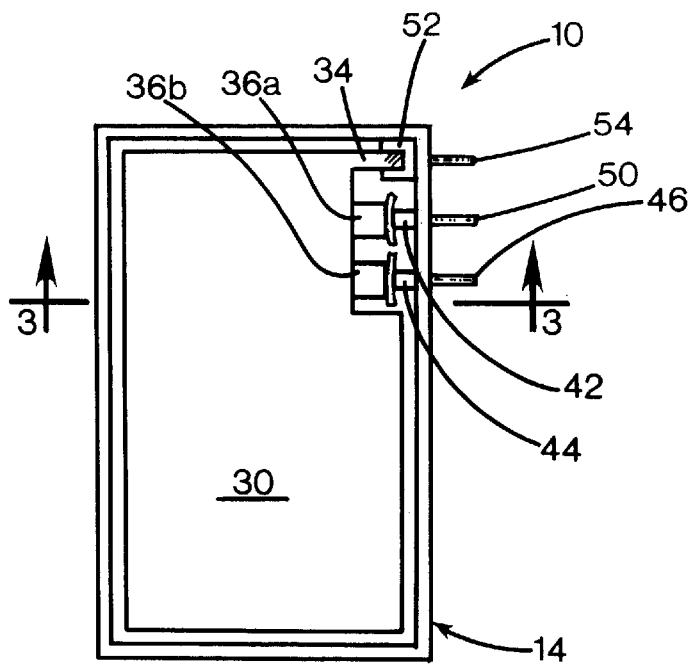
FIG. 2 is a plan view of the capacitor of FIG. 1.
Figure 3:
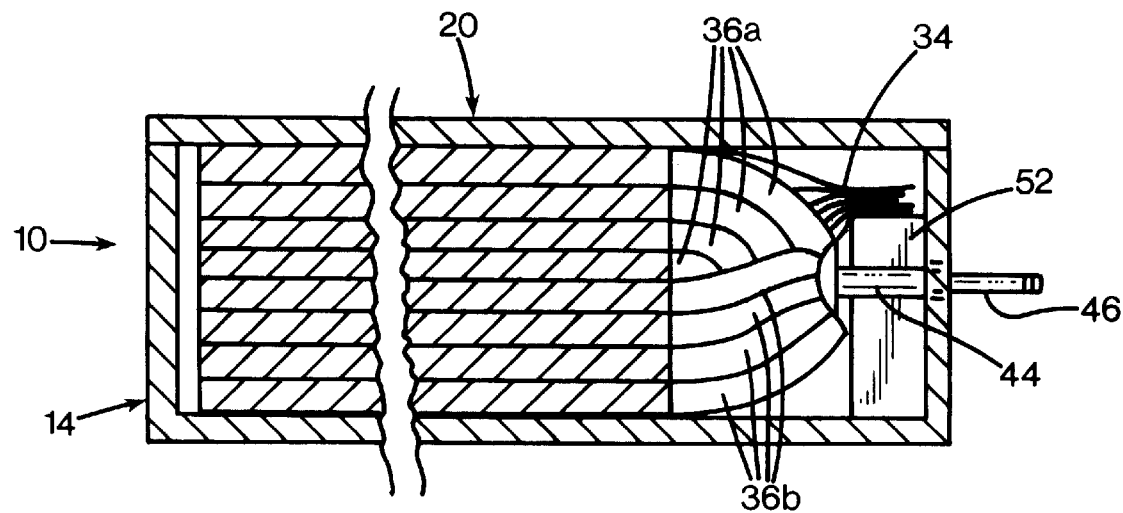
FIG. 3 is a sectional side view of the capacitor of FIG. 1, taken along line 3—3.

As shown in FIG. 2, the feed throughs 42, 44 are spaced apart, each in registration with a respective set of anode tabs 36a, 36b, so that the tabs of each group may be connected to the interior end of a feed through. Thus, each anode group is separately accessible. The housing also includes a cathode attachment step 52 in its interior at a position registered with the ends of the cathode tabs 34, so that the tabs may be staked or welded as a bundle to the step for electrical connection to the housing. A cathode lead 54 is directly electrically connected to the housing for connection to the cathodes. In an embodiment in which the cathode is isolated from the housing, in which the housing is non-conductive, or in which cathodes of different groups are isolated from each other, insulated feed throughs like those for the anodes may be used. As shown in FIG. 3, each set of anode tabs has been welded together and electrically connected to the terminal of a feed through.

Figure 4:
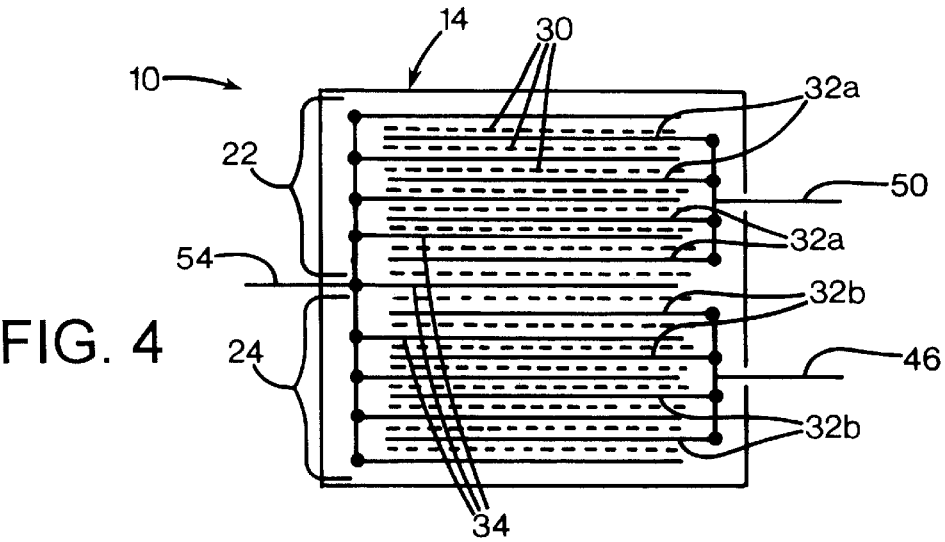
FIG. 4 is a schematic sectional side view of the capacitor of FIG. 1.
Figure 5:
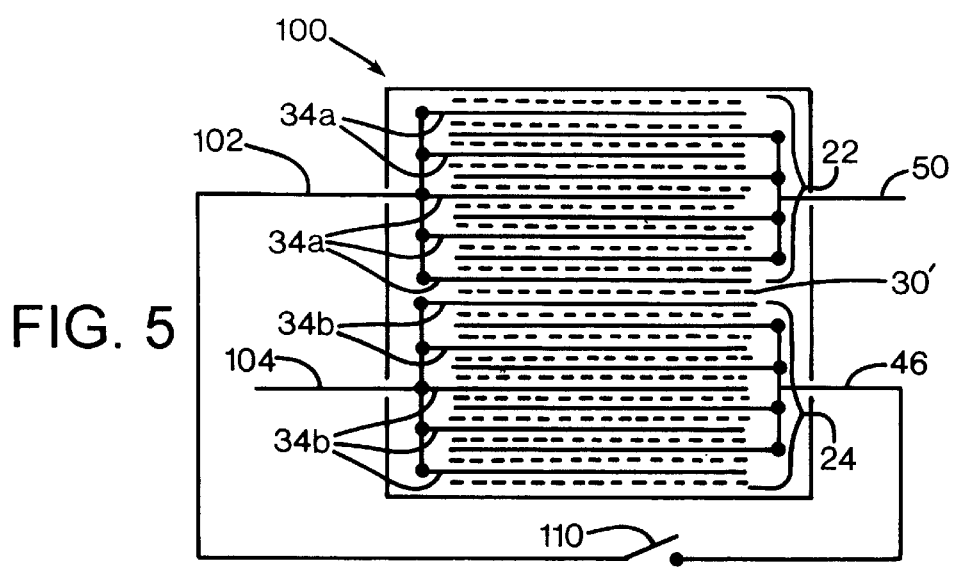
FIG. 5 is a schematic sectional side view of a capacitor according to a second embodiment of the invention.

FIG. 4 is a schematic representation of the preferred embodiment, in which the cathodes are all connected to each other and to the housing. FIG. 5 shows an alternative embodiment capacitor 100 in which the two groups 22, 24 of sheets are entirely electrically isolated from each other. In this embodiment, the cathodes are segregated, with cathodes 34a populating the first group 22, and cathodes 34b populating the second group 24. In this version, to isolate the groups of cathodes, an extra separator sheet 30' (dashed lines) separates the lowest cathode of the first group from the top cathode of the second group. This will further require the use of a "solid" electrolyte as is known in the art since the electrolyte must be separated for each group 22, 24. Insulated feed throughs 102, 104 are provided for separate connection of the capacitor groups, and extra separator sheets at the top and bottom of the entire stack insulates the housing from the extreme cathode sheets. In this embodiment, the groups are said to be fully isolated or independent of each other, because both the anodes and cathodes of each group are independent of the anodes and cathodes of other groups. Consequently, they may be used as independent capacitors. In a partially independent design such as of the preferred embodiment, either the cathodes or the anodes are independent from group to group, while the other is commonly connected among all groups.

While a partially independent design such as shown in the preferred embodiment permits independent charging and discharging of each group, it does not permit the groups to be connected in series for adding the voltages. The fully independent design allows the cathode lead 102 of the first group to be connected to the anode lead 46 of the second group via an external switch 110, so that connection to leads 50 and 104 would permit a voltage doubling.

Figure 6:
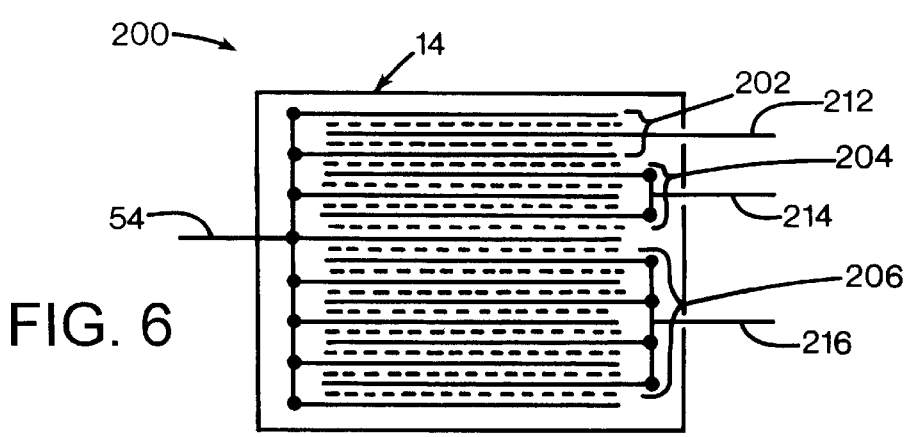
FIG. 6 is a schematic sectional side view of a capacitor according to a third embodiment of the invention.

FIG. 6 shows an further alternative embodiment capacitor 200 having three anode groups 202, 204, 206. Each is provided with a respective feed through 212, 214, 216, and contains a different number of anode layers. In this case, the number of layers increases by powers of two. The smallest group 202, having one anode layer for simplified illustration purposes, defines the smallest quantum of capacitance. The next group 204 has double that capacitance value, and the next group 206 double that of group 204. Thus, the groups may be combined, in the manner of binary counting, in various permutations to provide capacitance values of up to seven times the quantum value, in quantum increments. This may provide a selected discharge on demand, or, by using the fully independent design of FIG. 5, a selected voltage by serially connecting the groups desired.

While the invention is described in terms of a preferred and alternative embodiments, the following claims are not intended to be so limited. For instance, there is no limitation on the number of groups or numbers of layers per group that may be employed for applications. When a capacitance of a high level requiring variability within a narrow range is required, one group may have most layers to provide a nominal capacitance, with a few very small groups to provide additional capacitance above nominal when needed. The principles may also be applied in a rolled capacitor, with one or both of the conductive sheets being divided in one or more places, and having tab leads that extend radially out of an end of the rolled device.

I claim:

1. An electrolytic capacitor comprising:

a housing;

a plurality of charge storing layers within the housing;

each layer including at least a conductive anode layer, and a conductive cathode layer, the anode and cathode layers being electrically separate from each other and overlaying each other;

a first anode of a first one of the charge storing layers being connected to a first electrical feed through on the housing; and a second anode of a different one of the charge storing layers being connected to a second electrical feed through on the housing electrically separate from the first feed through.

2. The capacitor of claim 1 comprising at least a third anode electrically separate from the first and second anodes and connected to at least a third feed through.

3. The capacitor of claim 1 wherein the cathodes of each charge storing layer are electrically connected to each other.

4. The capacitor of claim 1 wherein the cathodes of at least one of the charge storing layers are electrically isolated from the cathodes of at least another of the charge storing layers.

5. The capacitor of claim 1 wherein the charge storing layers are arranged in at least two distinct groups, each group comprising a plurality of said anodes, and wherein the anodes are interconnected within each group, and isolated from the anodes of the other group.

6. The capacitor of claim 5 wherein each of said groups includes a plurality of cathodes which are interconnected within the group, and isolated from the cathodes of the other group, such that the cathodes of one group may be connected to the anodes of another group outside of the housing, providing a serially connected arrangement.

7. The capacitor of claim 6 wherein the groups are stacked laminarly so that an end cathode of one of said groups is spaced apart from and adjacent to an end cathode from another of said groups by a single separator sheet of insulator material.

8. The capacitor of claim 5 wherein the groups are stacked laminarly so that an end anode of one of said groups is spaced apart from an adjacent end anode from another of said groups.

9. The capacitor of claim 5 wherein there are more anode layers in one of said groups than in another of said groups.

10. The capacitor of claim 7 including a plurality of separator layers, each position between one of said anode layers and an adjacent one of said cathode layers.

11. An electrolytic capacitor comprising:

a housing;

a plurality of charge storing elements within the housing;

at least a first and second of the elements each having an anode connection connected to at least an anode sheet and a separate cathode connection connected to at least a cathode sheet; and at least one of the anode and cathode connections of the first element being electrically isolated from the corresponding anode and cathode connections, respectively, of the second element, such that the elements are at least partially independent.

12. The capacitor of claim 11 wherein each element includes a plurality of stacked planar conductive layers, and wherein the elements are overlaid in a laminar arrangement.

13. The capacitor of claim 11 wherein the cathode connections of the first and second elements are electrically isolated and the anode connections of the first and second elements are electrically isolated, such that the first and second elements are fully independent.

14. The capacitor of claim 11 including three elements that are at least partially independent.

15. The capacitor of claim 11 wherein each element includes a plurality of anode sheets and a plurality of cathode sheets.

16. The capacitor of claim 11 wherein the second element includes a different number of anode sheets than the first element, such that the second element has a different electrical characteristic from the first element.

* * * * *